United States Patent
Løvlund Toft

(10) Patent No.: US 11,673,216 B2
(45) Date of Patent: Jun. 13, 2023

(54) METHOD FOR REPAIRING A GEAR AND PROCESSING MACHINE FOR CARRYING OUT THE METHOD

(71) Applicant: CNC ONSITE A/S, Vejle (DK)

(72) Inventor: Hans Løvlund Toft, Bredsten (DK)

(73) Assignee: CNC ONSITE A/S, Vejle (DK)

( * ) Notice: Subject to any disclaimer, the term of this patent is extended or adjusted under 35 U.S.C. 154(b) by 0 days.

(21) Appl. No.: 16/885,795

(22) Filed: May 28, 2020

(65) Prior Publication Data
US 2020/0331103 A1    Oct. 22, 2020

Related U.S. Application Data

(63) Continuation of application No. PCT/DK2018/050297, filed on Nov. 15, 2018.

(51) Int. Cl.
| | |
|---|---|
| *B23P 6/00* | (2006.01) |
| *F03D 80/50* | (2016.01) |
| *B23P 15/14* | (2006.01) |
| *F16H 55/12* | (2006.01) |

(52) U.S. Cl.
CPC .............. *B23P 6/00* (2013.01); *B23P 15/14* (2013.01); *F03D 80/50* (2016.05); *F16H 55/12* (2013.01)

(58) Field of Classification Search
CPC .. B23P 6/00; B23P 15/14; F03D 80/50; F16H 55/12; F16H 2055/175
See application file for complete search history.

(56) References Cited

U.S. PATENT DOCUMENTS

| | | | |
|---|---|---|---|
| 1,115,557 A | 11/1914 | Livermore | |
| 2,707,884 A | 5/1955 | Jean-Baptiste | |
| 8,287,238 B2 * | 10/2012 | DiMascio | F03D 80/50 |
| | | | 416/170 R |
| 2009/0220343 A1 | 9/2009 | DiMascio et al. | |
| 2013/0008272 A1 | 1/2013 | Salov | |
| 2013/0243599 A1 | 9/2013 | Pasquet | |
| 2014/0112789 A1 | 4/2014 | Noirot et al. | |
| 2017/0241535 A1 * | 8/2017 | Brown | B23P 6/00 |

FOREIGN PATENT DOCUMENTS

| | | |
|---|---|---|
| EP | 2667026 A2 | 11/2013 |
| ES | 2437199 A2 | 1/2014 |
| WO | 2016062315 A3 | 6/2016 |

* cited by examiner

*Primary Examiner* — Christopher J Besler
(74) *Attorney, Agent, or Firm* — Elevated IP, LLC

(57) ABSTRACT

A method for repairing a gear (2) having a number of damaged teeth (4, 4', 4"), wherein the method comprises the step of removing material from the gear (2) hereby providing a pocket structure (28, 28', 28", 28'''), wherein said material includes at least one damaged tooth (4, 4'). Said method further comprises the step of providing a segment (12, 12', 12", 12''') to be inserted into the pocket structure (28, 28', 28", 28'''), wherein the segment (12, 12', 12", 12''') has a geometry that fits the geometry of the pocket structure (28, 28', 28", 28'''). The method comprises the step of radially inserting the segment (12, 12', 12", 12''') into the pocket structure (28, 28', 28", 28''') and attaching radially extending attachment structures (60, 60') through at least a portion (18, 18') of the segment (12, 12', 12", 12''') and further into at least a portion (32, 32') of the underlying structure (64) of the gear (2).

20 Claims, 9 Drawing Sheets

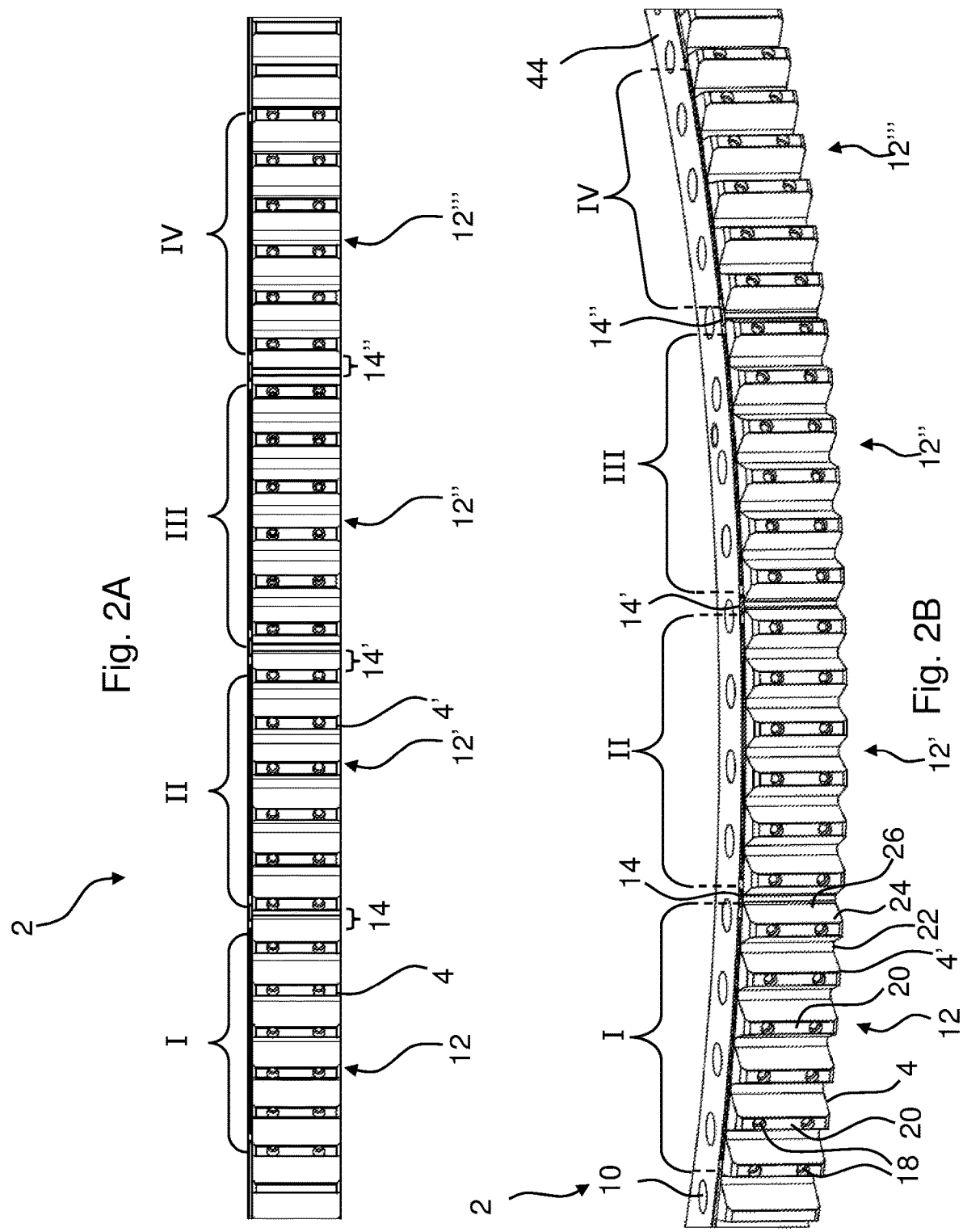

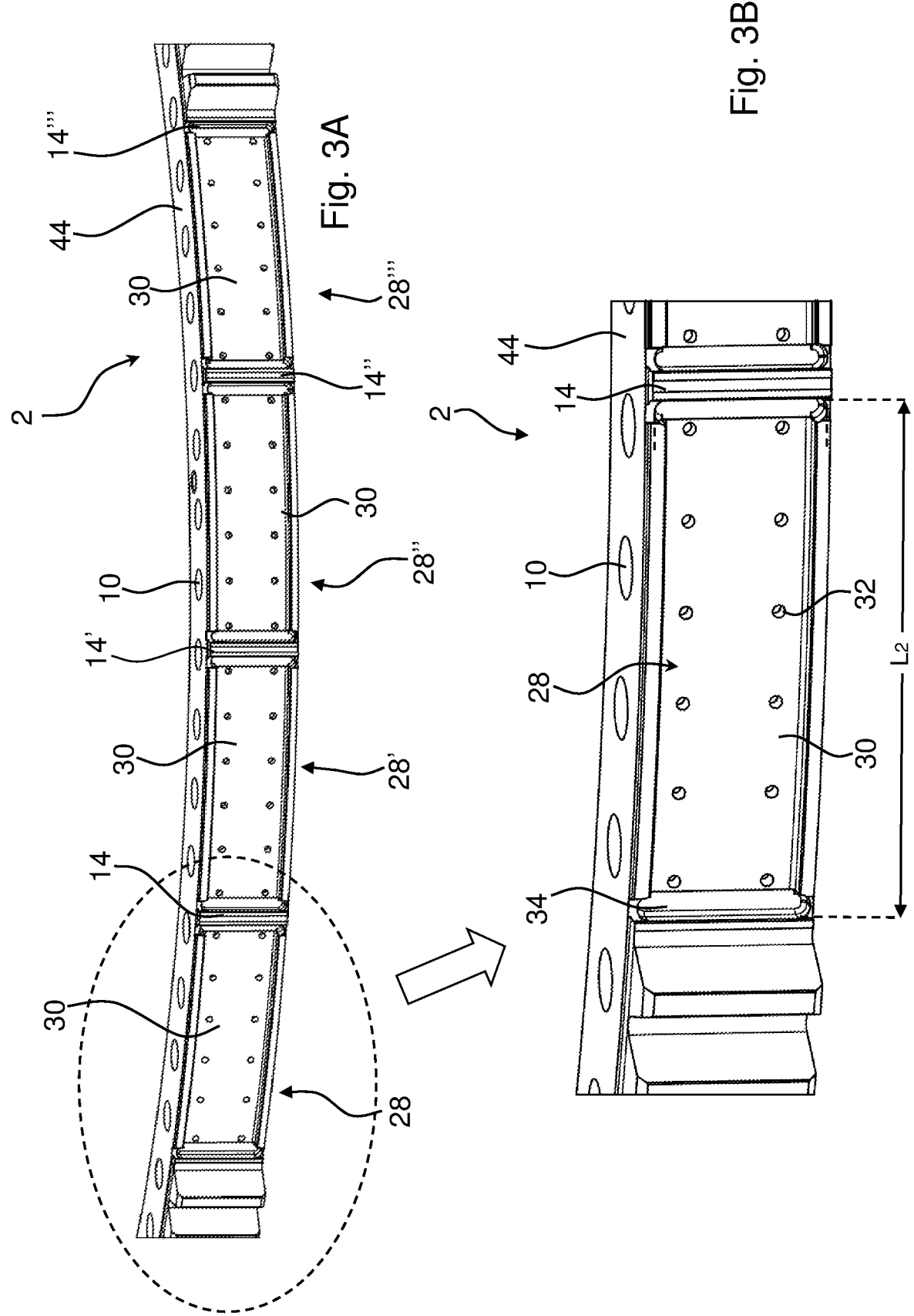

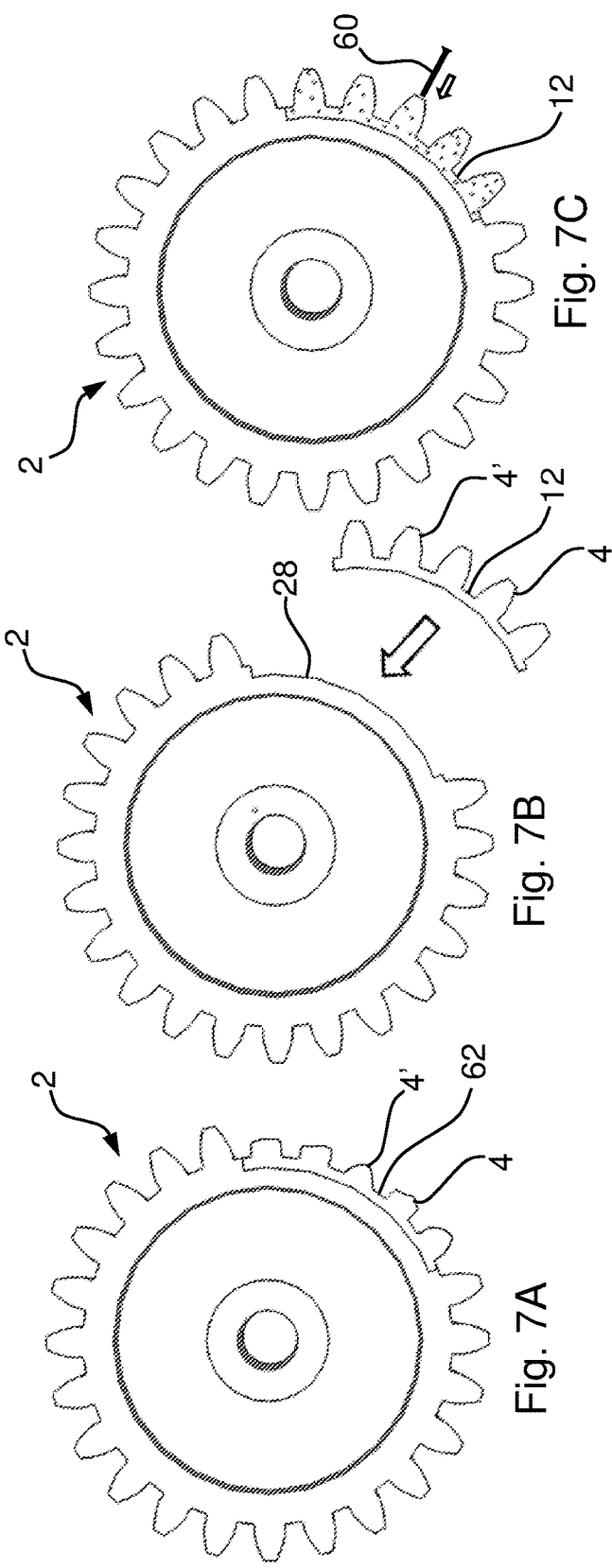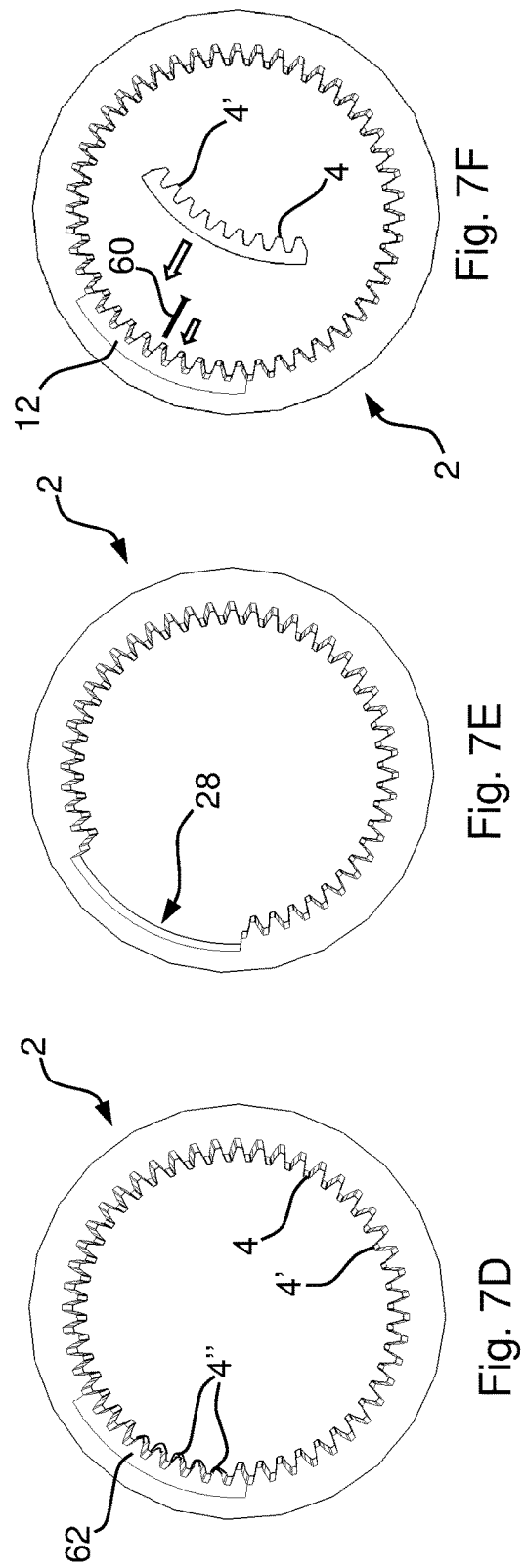

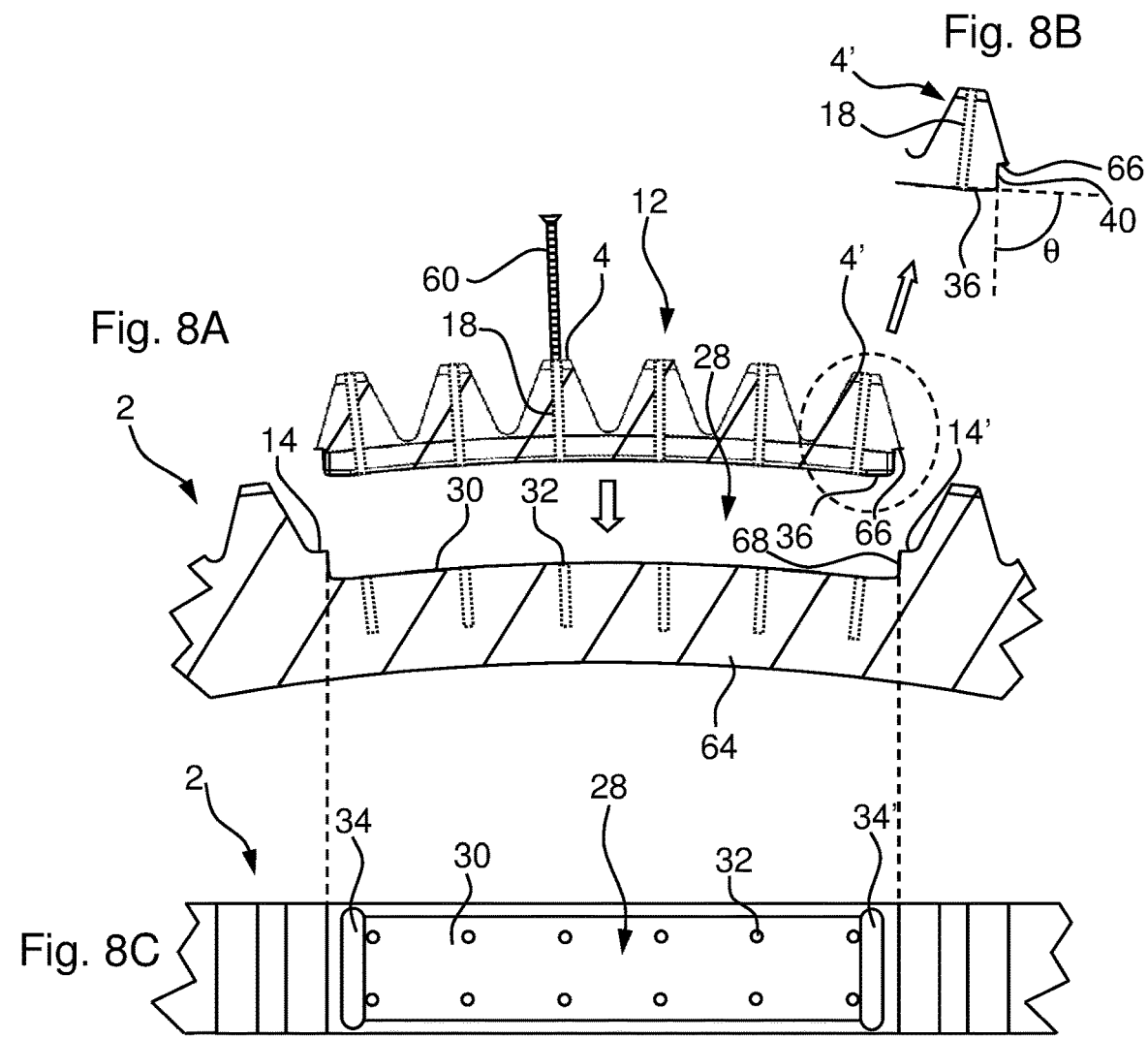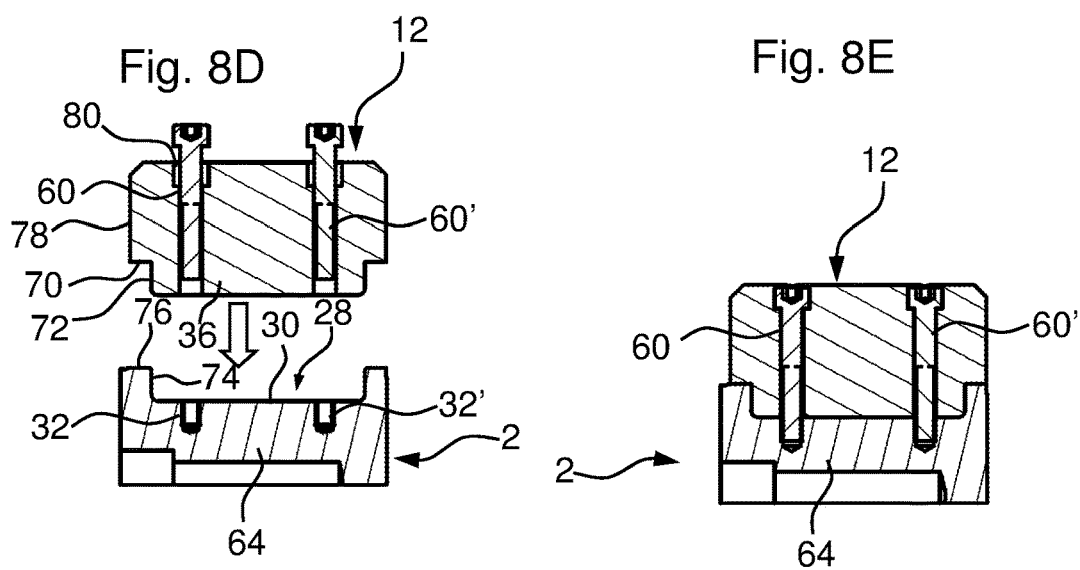

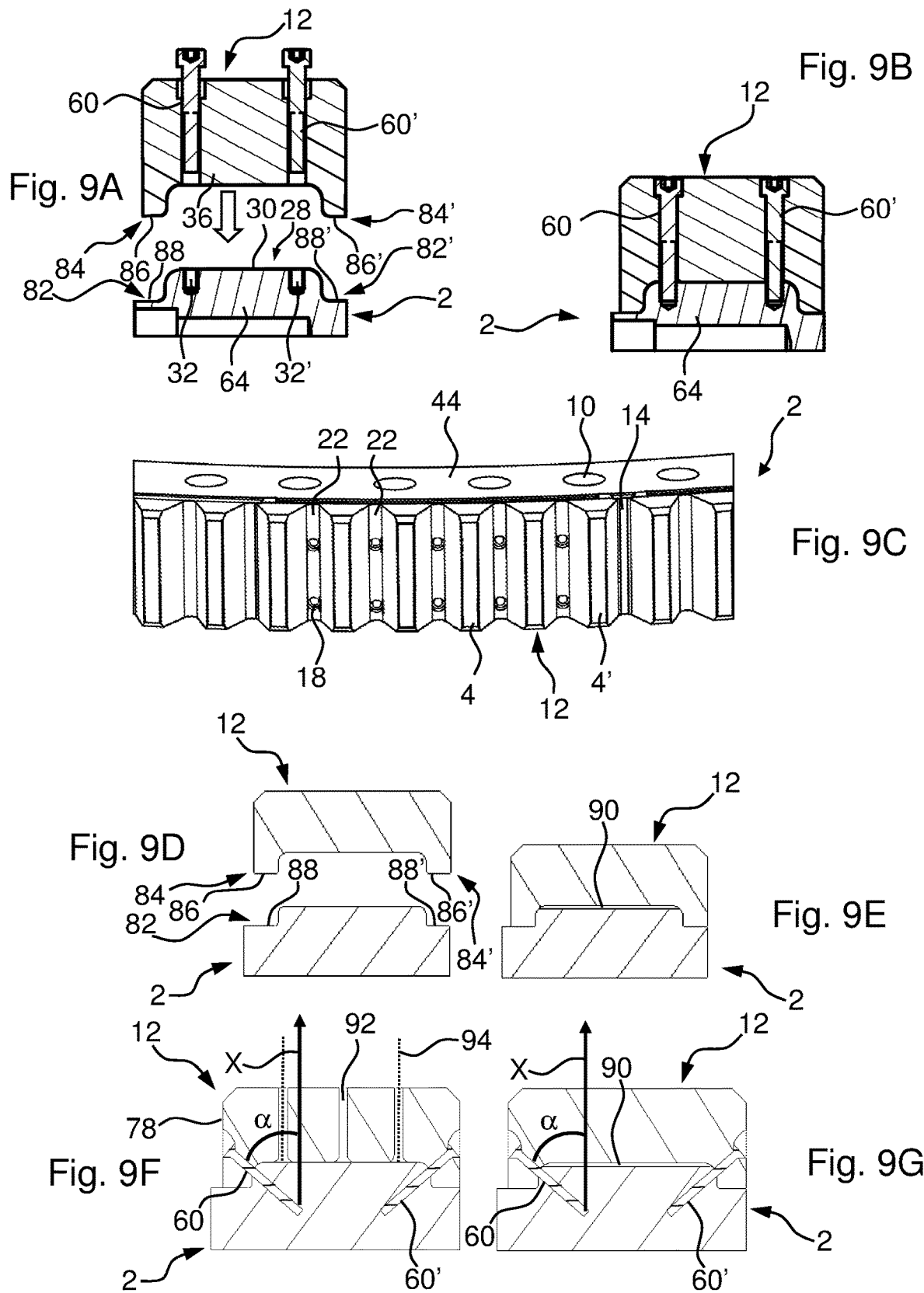

METHOD FOR REPAIRING A GEAR AND PROCESSING MACHINE FOR CARRYING OUT THE METHOD

CROSS-REFERENCE TO RELATED APPLICATIONS

This application is a continuation under 35 U.S.C. 111 of International Patent Application No. PCT/DK2018/050297, filed Nov. 15, 2018, which claims the benefit of and priority to Danish Application No. PA 2017 00684, filed Dec. 4, 2017, both of which are hereby incorporated by reference in their entireties.

FIELD OF THE INVENTION

The present invention relates to a method for repairing a gear having a number of damaged teeth. The present invention also relates to a processing machine for carrying out the method including providing pocket structures in a gear. The invention is in particular applicable for repairing a yaw ring in a wind turbine.

BACKGROUND

The prior art discloses several ways of repairing damaged teeth of gears.

US2009220343A1 discloses a method for repairing a hub pitch gear assembly. The method includes providing a ring assembly for adjusting a pitch angle of a wind turbine blade. The ring has a plurality of gear teeth. When applying the method, a segment comprising at least one gear tooth of the ring assembly is removed. Hereby, a repair cavity is formed. A repair segment configured to match the repair cavity is provided and the repair segment is directed into the repair cavity and fastened in position. A repaired pitch gear assembly and wind turbine are also disclosed.

WO2016062315A2 discloses a method for repairing a gear part in a wind turbine, in particular repairing damaged teeth of a toothed rim. A repair cavity is formed by removing material, including one or more damaged teeth, from the gear part by drilling one or more holes through the gear part along a direction which is substantially parallel to an axis of circular symmetry of the gear part. A repair segment comprising one or more replacement gear teeth, and having a geometry which matches a geometry of the repair cavity, is arranged in the repair cavity, and attached to the gear part by introducing one or more fasteners into fastener openings formed in the gear part.

US20140112789A1 discloses a roller bearing comprising a plurality of gear segments removably attached to an outer ring of the roller bearing. Accordingly, when one or more teeth are damaged, the respective segment(s) can be replaced with a new one.

When repairing a yaw gear, however, there is no space to axially attach the repair segments. Moreover, it is not possible to apply this method to replace adjacent repair segments because attachment of repair segments requires a fixed support (which is not present), to which the end structure of the repair segment is fixed.

Thus, there is a need for a method and a machine that can reduce or even eliminate the above-mentioned disadvantages of the prior art. It is an object of the present invention to provide a method and a machine that can be used to repair a yaw gear. It is also an object to provide a method to replace teeth of non-segmented gears.

It is also an object of the invention to repair and replace adjacent repair segments.

SUMMARY

The object of the present invention can be achieved by a method as defined in claim 1 and by a machine having the features as defined in claim 10. Preferred embodiments are defined in the dependent subclaims, explained in the following description and illustrated in the accompanying drawings.

The method according to the invention is a method for repairing a gear having a number of damaged teeth, wherein the method comprises the step of:

removing material from the gear hereby providing a pocket structure, wherein said material includes at least one damaged tooth;

providing a segment to be inserted into the pocket structure, wherein the segment has a geometry that fits the geometry of the pocket structure, wherein the method comprises the step of milling a damaged area, so that it fits the geometry of the new segment; and radially inserting the segment into the pocket structure and attaching radially extending attachment structures through at least a portion of the segment and further into at least a portion of the underlying structure of the gear.

Hereby, it is possible to provide a method that can be used to repair a yaw gear even though there is limited space available for carrying out the repair.

The method also makes it possible to replace adjacent repair segments and thus all teeth along a selection or the entire circumference of the gear can be repaired using the method according to the invention.

In principle, the method according to the invention can be used for repairing all types of gears having a number of damaged teeth. The method makes it possible to replace teeth of non-segmented gears.

The method may in particular be used for repairing a yaw ring (gear) in a wind turbine.

The method comprises the step of removing material from the gear hereby providing a pocket structure, wherein said material includes at least one damaged tooth. This step is preferably carried out by applying a processing machine that is capable of being detachably attached to the gear and to process the gear radially from outside. Hereby, the method can be used in a wind turbine for repairing a yaw ring (gear).

The method comprises the step of providing a segment to be inserted into the pocket structure, wherein the segment has a geometry that fits the geometry of the pocket structure. The segment will be premanufactured. When the gear to be repaired is known, it is possible to provide a segment that has a geometry that corresponds to the gear. By providing a segment having a geometry that fits the geometry of the pocket structure, the geometric fit will prevent displacement of the segment tangentially and axially.

The pocket structure may have any suitable geometry. In one embodiment, the pocket structure comprises one or more portions constituting one or more cavities. In one embodiment, the pocket structure comprises one or more receiving structures configured to receive corresponding protruding structures of the segment. In one embodiment, the pocket structure comprises one or more protruding members configured to be received by corresponding receiving members of the segment.

The method comprises the step of radially inserting the segment into the pocket structure. This step is of great importance when the method is applied for repairing a yaw ring (gear) in a turbine, because the space available allows for inserting the segment in this manner.

The method comprises the step of attaching radially extending attachment structures through at least a portion of the segment and further into at least a portion of the underlying structure of the gear. Hereby, it is possible to prevent the segment from falling out. Accordingly, it is possible to provide a firm and reliable attachment of the segment. This fastening step prevents radial displacement of the segment.

In one embodiment, the method comprises the step of attaching one or more bolts through at least a portion of the segment and further into at least a portion of the underlying structure of the gear, wherein the bolts are angled relative to the radial direction of the gear. In one embodiment, bolts are angled 20-80 degrees, relative to the radial direction of the gear. In another embodiment, bolts are angled 30-70 degrees, relative to the radial direction of the gear. In a further embodiment, bolts are angled 35-60 degrees, relative to the radial direction of the gear.

The radially extending attachment structures may be bolts. The portion of the segment may be a through hole. The portion of the underlying structure of the gear may be holes.

It may be an advantage that the portion of the underlying structure of the gear is threaded holes.

It is preferred that the bolts are provided with an outer thread corresponding to an inner thread provided in holes provided in the underlying structure of the gear.

The method comprises the step of milling a damaged area, so that it fits the geometry of the new segment. Hereby, it is possible to replace teeth of gears that are not segmented but provided as a one-piece body.

Due to the thermal expansion properties of the segment, it may be beneficial to cool down the segment, prior to inserting the segment in the pocket structure, in order to facilitate the insertion of the segment in the pocket structure.

It may be advantageous that the method comprises the step of providing a remaining structure at the end of the pocket structures.

Hereby, it is possible to leave a part of the original gear when processing the gear (creating the pocket structure). The remaining structure will prevent the segment from moving tangentially when the segment has been inserted into the pocket structure. Hereby, it is possible to provide a solution that fulfills the requirements with respect to mechanical strength.

It may be an advantage that the grove structure is surrounded by walls preventing the segment from being displaced axially.

It may be beneficial that the method comprises the step of drilling a number of radially extending holes in the underlying structure. Hereby, it is possible to utilize the holes when fixing the segment to the underlying structure e.g. by means of bolts.

It may be an advantage that each hole is provided with threads extending along at least a portion of the hole.

In one embodiment according to the invention, the holes are threaded, and the threaded portion extends along the entire length of each hole.

It may be advantageous that the method comprises the step of fixing several segments in extension of each other, wherein adjacent segments are only separated by the remaining structures. Hereby, it is possible to replace adjacent repair segments.

It may be beneficial that the method comprises the step of providing the pocket structure that comprises a bottom surface extending between two opposing end structures.

Hereby, it is possible to provide a geometry that prevents the mounted segments from being moved in an efficient way. Moreover, it is possible to limit the depth of the pocket structure near the remaining structure. Accordingly, less material is removed from the gear during the repair process.

In one embodiment according to the invention, the bottom surface is formed as a plane surface.

In another embodiment according to the invention, the bottom surface is formed as an arced surface constituting a portion of a cylindrical surface. Hereby, it is possible to remove a minimum amount of material, when providing the pocket structure. Accordingly, mechanical strength of the gear is reduced as little as possible when providing the pocket structure.

It may be an advantage that no sharp corners are provided and that all corners are provided as arced structures in order to prevent the notch effect (stress peaks) which may reduce the mechanical strength of the repaired gear. Accordingly, it may be beneficial that the end structures are formed as a rectangle with rounded corners to prevent the notch effect.

It may be advantageous that the end structures are radially displaced relative to the bottom surface. Hereby, less material has to be removed from the gear and thus the mechanical strength of the processed gear can be increased.

It may be beneficial that the width of the end structures is larger than the width of the bottom surface. Hereby, less material has to be removed from the gear and furthermore a stronger attachment between the segment and the pocket structure can be achieved.

It is preferred that the method comprises the step of providing holes in the bottom surface of the pocket structure.

It may be advantageous that the method comprises the step of providing a recess at at least one end of the segment. The recess allows for leaving a remaining structure present at the gear and still being capable of inserting the segment into the pocket structure.

In a preferred embodiment according to the invention, the recess extends through a portion of the outermost tooth of the segment.

It may be an advantage that the remaining structure extends between the flanks of two adjacent teeth. Hereby, it is possible to replace the entire protruding part of damaged teeth and still apply the remaining structure to provide a reliable solution, in which the remaining structure prevents the segment from being tangentially displaced.

The processing machine according to the invention is a processing machine for repairing a gear having a number of damaged teeth, said processing machine comprising:
- a number of gear attachments configured to be detachably attached to the gear and
- a moveably arranged carrier having a spindle unit configured to carry out a milling process hereby removing one or more damaged teeth and providing a pocket structure configured to receive a toothed segment, wherein the processing machine is configured to carry out the milling process radially from outside the gear.

Hereby, it is possible to provide a machine that can be used to repair a yaw gear even though there is limited space available for carrying out the repair.

The number of gear attachments may be one, two, tree, four or more. The gear attachments are configured to be detachably attached to the gear and may have any suitable size and may be of any suitable type.

In one embodiment according to the invention, the gear attachments are configured to be attached to the teeth of a gear.

The processing machine comprises a moveably arranged carrier having a spindle unit configured to carry out a milling process hereby removing one or more damaged teeth and providing a pocket structure configured to receive a toothed segment, wherein the processing machine is configured to carry out the milling process radially from outside or inside the gear.

It is preferred that the spindle unit is moveably arranged in the processing machine in such a manner that the spindle unit can be moved radially along the radial axis and/or the axial axis and/or the tangential axis of the processing tool.

It may be advantageous that the spindle unit is moveably arranged in the processing machine in such a manner that the spindle unit can be moved radially along the radial axis and the axial axis and the tangential axis of the processing tool.

It may be beneficial that the processing machine comprises:
- one or more sensors configured to detect one or more parameters indicative of the geometry of the structure being processed by the spindle unit and
- a controller configured to control the spindle unit on the basis of said one or more parameters.

Hereby, it is possible to perform a milling process based on feedback, preferably provided (preferably instantaneously) by sensors capable of performing real-time measurement.

It may be advantageous that the processing machine comprises one or more sensors configured to provide geometrical information about the structure being processed by the processing tool.

It may be an advantage that the processing machine comprises sensors configured to provide geometrical information about the pocket structure being formed by the spindle unit of the processing tool.

In a preferred embodiment according to the invention, the controller is configured to control the position of the spindle unit on the basis of said one or more parameters. The one or more parameters may be one or more geometric parameters such as one or more distances, one or more angles or one or more surface structure properties.

In a preferred embodiment according to the invention, the controller is configured to control the milling depth on the basis of said one or more parameters.

It may be beneficial that the processing machine comprises one or more guides and a slide comprising a carrier comprising said spindle unit, wherein said slide is moveably mounted on (attached to) the one or more guides. Hereby, it is possible to move the spindle unit along the length of the guide in order to position the spindle unit in positions in which material has to be removed from the gear.

It may be advantageous that the spindle unit is moveably arranged in the processing machine in such a manner that the spindle unit can be moved radially along the radial axis and/or the axial axis and/or the tangential axis of the processing tool. This may be done by applying one or more actuators.

It may be beneficial that the processing machine comprises a drilling unit configured to drill holes in the gear. Hereby, the drilling machine can provide holes, e.g. threaded holes in the gear.

In one embodiment according to the invention, the drilling unit is also the spindle unit.

It may be beneficial that the processing machine comprises a first arm extending between a first gear attachment and a support member being arranged parallel to the axial surface of the gear.

It may be beneficial that the processing machine comprises a second arm extending between a second gear attachment and the support member.

It may be beneficial that the longitudinal axis of the support member extends parallel to the tangential axis of the processing machine.

It may be beneficial that the processing machine comprises a support member that comprises one (or two parallel) guides and a slide being slidably attached to the guide(s). Hereby, it is possible to move the slide along the tangential axis of the processing machine.

It may be an advantage that the processing machine comprises a CNC controller. Hereby, it is possible to carry out a fast and high tolerance quality milling process.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 2A shows a side view of a part of a gear, in which several teeth have been replaced by using the method according to the invention;

FIG. 2B shows a perspective, side view of the gear shown in FIG. 2A;

FIG. 3A shows a perspective side view of a part of a gear, in which several teeth have been removed;

FIG. 3B shows a close-up view of one of the pocket structures of the gear shown in FIG. 3A;

FIG. 7A shows a top view of a gear comprising a damaged portion comprising a number of damaged teeth that need to be replaced;

FIG. 7B shows a top view of the gear shown in FIG. 7A in a configuration, in which the damaged portion has been removed by using the method according to the invention;

FIG. 7C shows a top view of the gear shown in FIG. 7B in a configuration, in which the segment has been inserted into the pocket structure;

FIG. 7D shows a top view of an internal gear, in which the teeth are provided on the inside surface of a hollow cylindrical form;

FIG. 7E shows a top view of the gear shown in FIG. 7D in a configuration, in which the damaged portion has been removed by using the method according to the invention;

FIG. 7F shows a top view of the gear shown in FIG. 7E in a configuration, in which the damaged portion has been inserted into the pocket structure;

FIG. 8A shows a cross-sectional view of a gear being repaired by using the method according to the invention;

FIG. 8B shows a view of the end tooth of the segment shown in FIG. 8A;

FIG. 8C shows a top view of the portion of the gear shown in FIG. 8A;

FIG. 8D shows a cross-sectional view of a gear, in which a damage portion has been removed to form a pocket structure configured to receive a segment provided with new teeth;

FIG. 8E shows a cross-sectional view of a gear shown in FIG. 8D in a configuration, in which the segment has been attached to the gear;

FIG. 9A shows a cross-sectional view of a gear, in which a damaged portion has been removed to form a pocket structure configured to receive a segment provided with new teeth;

FIG. 9B shows a cross-sectional view of the gear shown in FIG. 9A in a configuration, in which the segment has been attached to the gear;

FIG. 9C shows a perspective view of a gear, in a configuration, in which a segment has been attached to a pocket structure of the gear;

FIG. 9D shows a cross-sectional view of a segment being attached to a gear;

FIG. 9E shows a cross-sectional view of the segment shown in FIG. 9D in a configuration, in which the segment has been attached to the gear;

FIG. 9F shows a cross-sectional view of a segment attached to a gear and

FIG. 9G shows a cross-sectional view of another segment attached to a gear.

DETAILED DESCRIPTION

Figure 1A:
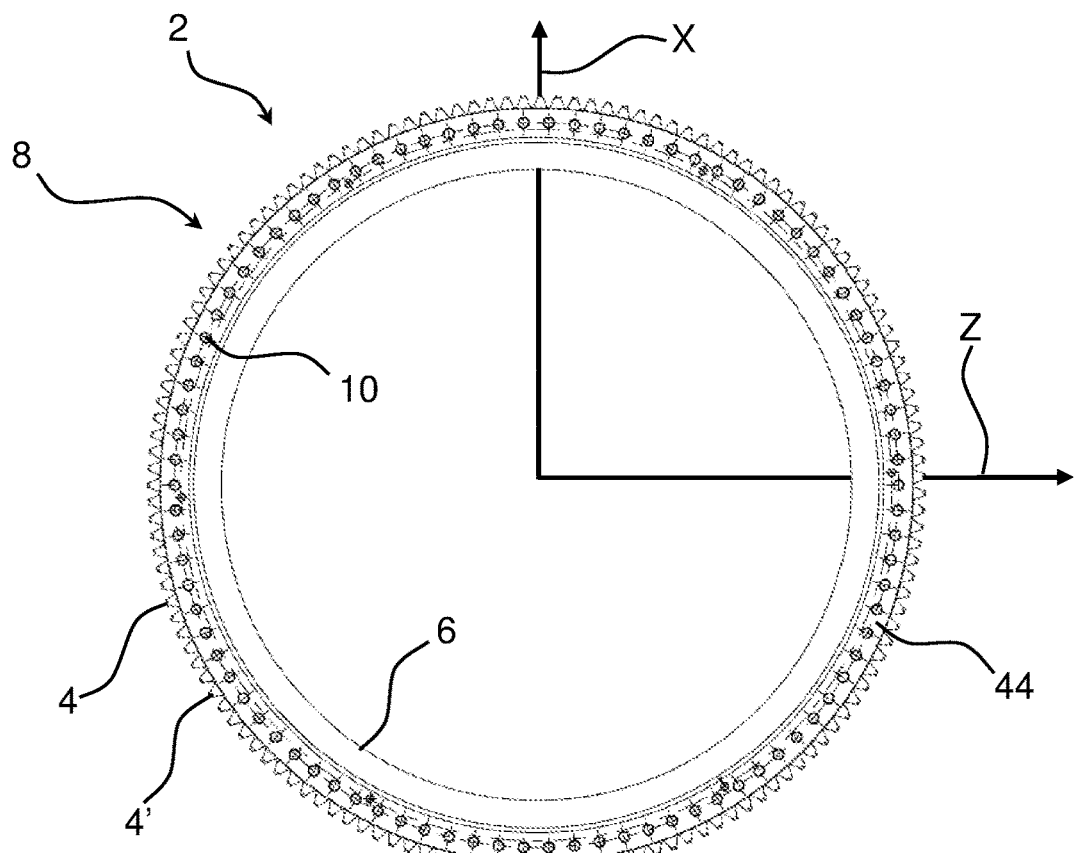
FIG. 1A shows a top view of a yaw gear provided with a toothed outer rim.

Referring now in detail to the drawings for the purpose of illustrating preferred embodiments of the present invention, a gear 2 to be repaired by means of a method according to the invention is illustrated in FIG. 1A.

Figure 1B:
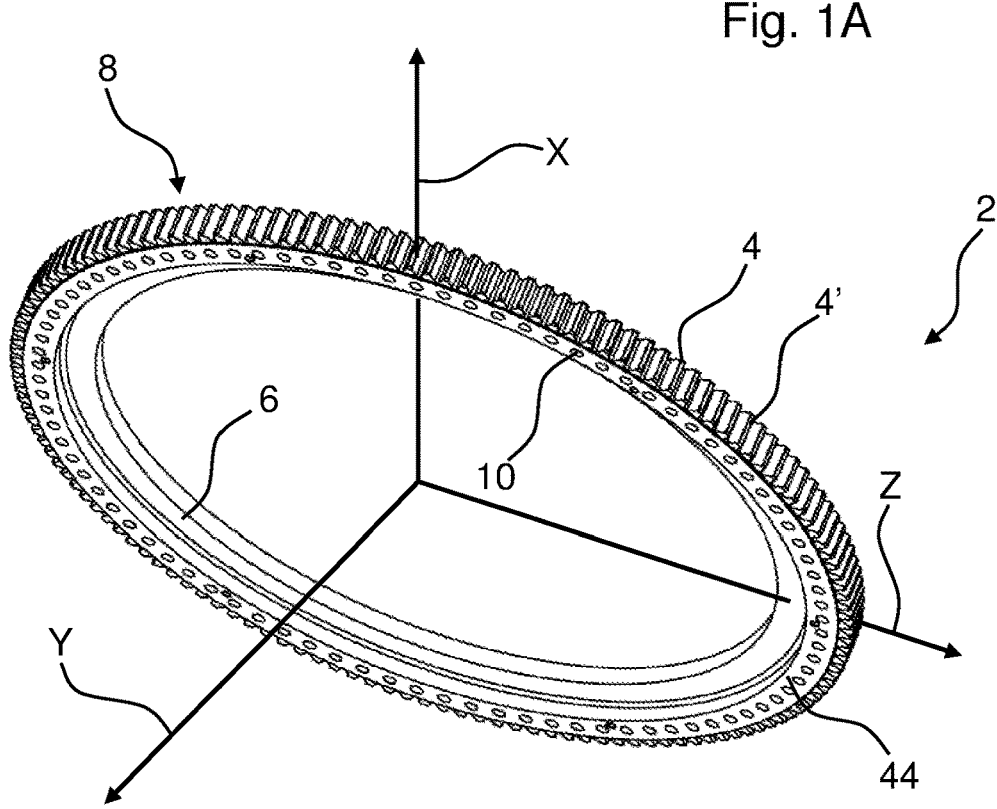
FIG. 1B shows a perspective, side view of the yaw gear shown in FIG. 1A.

FIG. 1A illustrates a schematic top view of a yaw gear 2 of a wind turbine, whereas FIG. 1B illustrates a perspective, side view of the yaw gear 2 shown in FIG. 1A.

The yaw gear 2 comprises a longitudinal axis X extending perpendicular to a first lateral axis Y and a second lateral axis Z of the yaw gear 2. The yaw gear 2 is provided with a toothed outer rim 8. A plurality of teeth 4, 4' are evenly distributed along the outer rim 8. The yaw gear 2 comprises an axial surface 44 provided with a plurality of axially extending holes 10 (extending parallel to the longitudinal axis Y) provided in the axial surface 44. The axial surface 44 extends perpendicular to the longitudinal axis Y.

When the yaw gear 2 is arranged in a wind turbine, it is not possible to access the teeth 4, 4' axially. The limited space available when the yaw gear 2 is arranged in a wind turbine, however, allows for accessing the teeth 4, 4' radially.

Therefore, the methods suggested in the prior art including US2009220343A1 and WO2016062315A2 are not suitable for being used for repairing a yaw gear being installed in a wind turbine.

FIG. 2A illustrates a side view of a part of a gear 2, in which several teeth 4, 4' have been replaced by using the method according to the invention. FIG. 2B illustrates a perspective, side view of the gear 2 shown in FIG. 2A. The gear 2 corresponds to the one shown in FIG. 1A and FIG. 1B after a plurality of teeth 4, 4' have been repaired by using the method according to the invention.

It can be seen that a plurality of segments 12, 12', 12", 12''' have been arranged in portions I, II, III, IV, into which the segments 12, 12', 12", 12''' have been attached to the gear 2. Initially, a corresponding number of pocket structures (see FIG. 3A) have been provided along the outer rim of the gear 2. In each pocket structure, a portion, I, II, III, IV has been inserted and attached. Each segment 12, 12', 12", 12''' comprises a plurality of teeth 4, 4'. Hereby, it is possible to replace damaged teeth 4, 4', by new teeth 4, 4' of the segment 12, 12', 12", 12'''.

As it can be seen in FIG. 2A and FIG. 2B, adjacent portions I, II, III, IV are separated by a remaining structure 14, 14', 14". Each remaining structure 14, 14', 14" is used for providing a reliable fixation of the segment 12, 12', 12", 12''' in the pocket structures. Moreover, the remaining structures 14, 14', 14" make it possible to arrange the segment 12, 12', 12", 12''' in (end to end) extension of each other, whereas this is not possible when using the prior art methods.

The remaining structures 14, 14', 14" comprise the structure between two adjacent teeth 4, 4' and thus, it is possible to replace all the teeth 4, 4' desired by using the method according to the invention.

Each portion comprises six teeth 4, 4', however, it is possible to apply segments 12, 12', 12", 12''' having another number of teeth 4, 4'. In one embodiment according to the invention, the method comprises the step of attaching one or more segments 12, 12', 12", 12''' having one tooth.

In another embodiment according to the invention, the method comprises the step of attaching one or more segments 12, 12', 12", 12''' having two teeth.

In a further embodiment according to the invention, the method comprises the step of attaching one or more segments 12, 12', 12", 12''' having three teeth.

In an even further embodiment according to the invention, the method comprises the step of attaching one or more portions I, II, III, IV having four teeth.

In another embodiment according to the invention, the method comprises the step of attaching one or more segments 12, 12', 12", 12''' having five teeth.

In an even further embodiment according to the invention, the method comprises the step of attaching one or more segments 12, 12', 12", 12''' having six or more teeth.

It can be seen that each segment 12, 12', 12", 12''' comprises teeth 4, 4' provided with holes 18 for fixing the teeth to the underlying structure. The holes 18, preferably, extend radially.

In one embodiment according to the invention, the holes 18 are formed as straight cylindrical holes.

In one embodiment according to the invention, the holes are formed as strait cylindrical holes 18.

In another embodiment according to the invention, the holes 18 are formed as threaded holes 18.

Each tooth 4, 4' is provided with two holes 18. In another embodiment according to the invention, the teeth 4, 4' may be provided with a single hole 18. In a further embodiment according to the invention, the teeth 4, 4' may be provided with three or more holes 18.

The gear 2 comprises an axial surface 44 provided with a plurality of holes 10. The holes 10 are evenly distributed along the axial surface 44.

Each segment 12, 12', 12", 12'" comprises teeth 4, 4' separated by a bottom land 22. Each tooth 4, 4' comprises a top land 20 extending between faces 24 of the teeth 4, 4'. The proximate portion of each tooth 4, 4' comprises a flank 26 extending between the between faces 24 and the adjacent bottom land 22.

FIG. 3A illustrates a perspective side view of a part of a gear 2, in which several teeth have been removed, whereas FIG. 3B illustrates a close-up view of one of the pocket structures 28 of the gear shown in FIG. 3A. The part of a gear 2 shown in FIG. 3A comprises four pocket structures 28, 28', 28", 28'" each separated by a remaining structure 14, 14', 14".

Each pocket structure 28, 28', 28", 28'" comprises a bottom surface 30 provided with threaded holes 32 matching the holes in the teeth of the segments to be attached into the pocket structures 28, 28', 28", 28'".

In FIG. 3B, the gear 2 has an axial surface 44 provided with holes 10. The gear 2 is provided with a pocket structure 28 having a bottom surface 30 provided with threaded holes 32. The end structures 34 are shaped as a rectangle with rounded corners and are raised to a higher level than the bottom surface 30. The segments (see FIG. 5A, FIG. 5B and FIG. 5C) have a geometry that matches the geometry of the pocket structures 28, 28', 28", 28'". Accordingly, once a segment is arranged in a pocket structure 28, 28', 28", 28'", the geometry of the pocket structure 28, 28', 28", 28'" will prevent the segment from being moved axially (along the longitudinal axis of the gear 2) and tangentially (along the circumference of the gear 2).

In order to prevent the segments from being moved radially, the segments may be fixed to the pocket structures 28, 28', 28", 28'" by using bolts (not shown) that are screwed into the threaded holes 32.

In a preferred embodiment according to the invention, the segments are attached to the pocket structures 28, 28', 28", 28'" by using a shrink-fitting technique. By cooling down the segments before assembly, it is possible to arrange the segments in the pocket structures 28, 28', 28", 28'". When the segments return to the ambient temperature after assembly, thermal expansion of the segments causes an interference fit to be achieved by the relative size change after assembly.

By applying said shrink-fitting technique, it is possible to expand the segments to slightly greater than the dimensions of the pocket structures 28, 28', 28", 28'". Accordingly, the pocket structures 28, 28', 28", 28'" will fit around the segments and provide a reliable attachment of the segments to the pocket structures 28, 28', 28", 28'". The length $L_2$ of the pocket structure 28 is indicated in FIG. 3B.

Figure 4A:
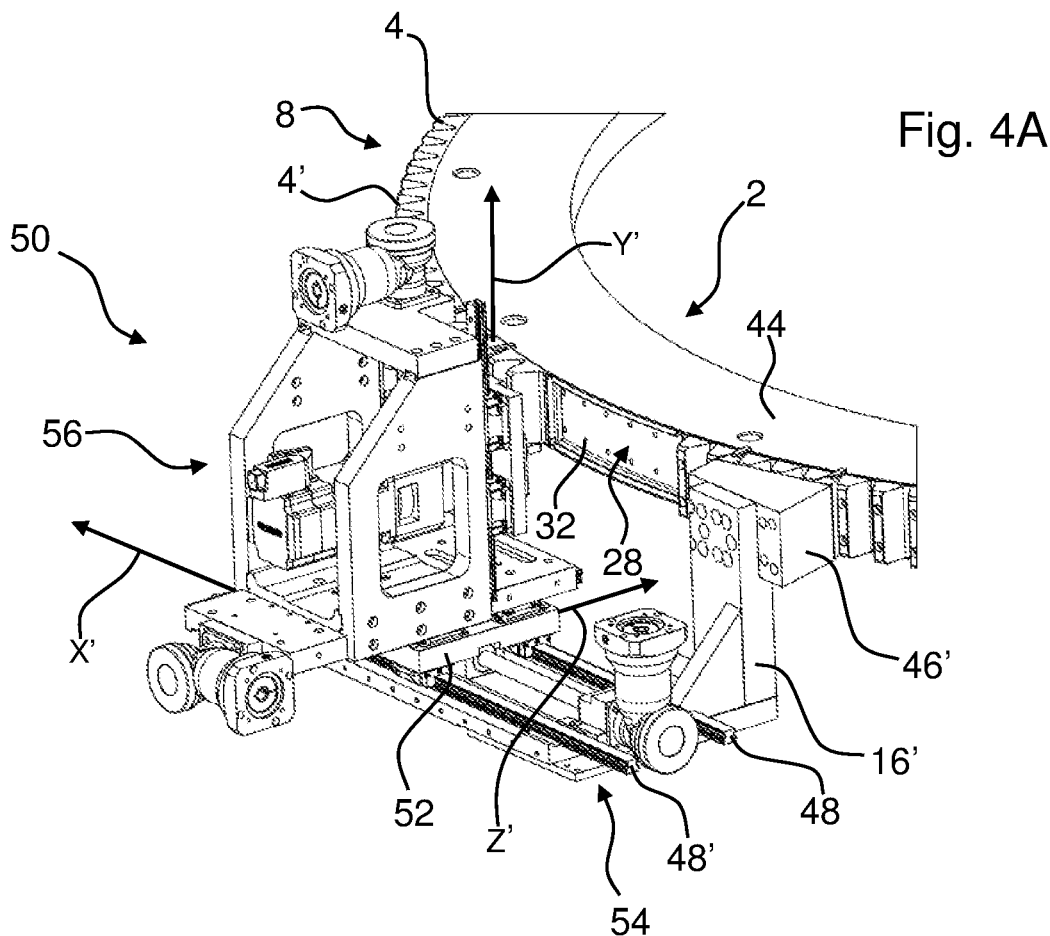
FIG. 4A shows a first perspective view of a processing machine used to provide a gear with a pocket structure configured to receive a segment comprising a toothed rim.
Figure 4B:
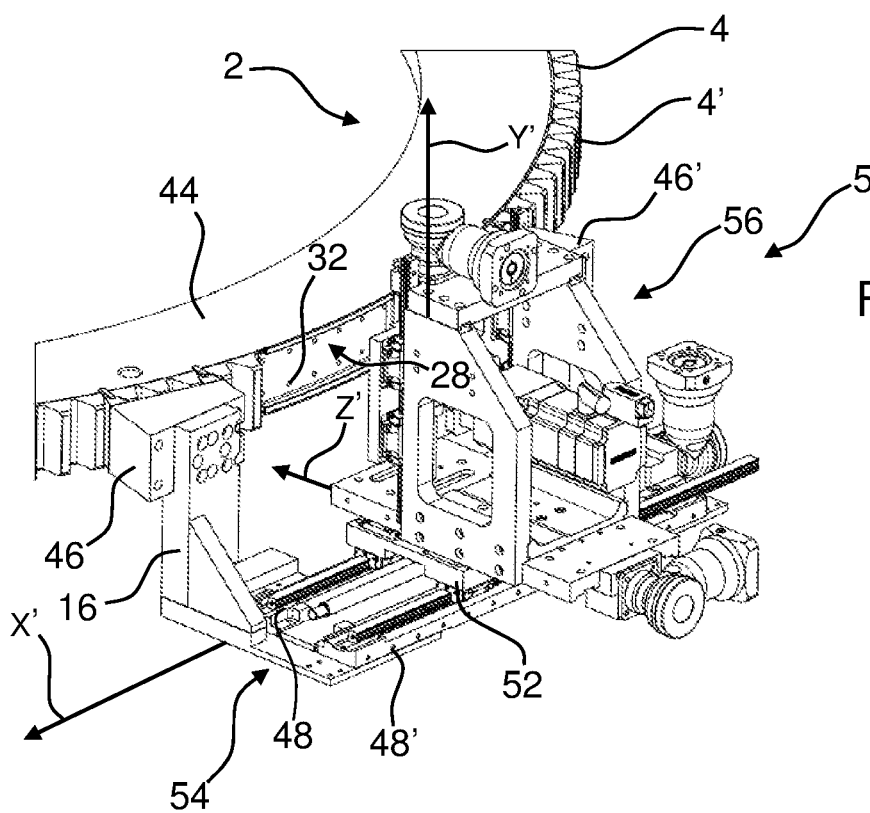
FIG. 4B shows a second perspective view of a processing machine shown in FIG. 4A.

FIG. 4A illustrates a first perspective view of a processing machine 50 according to the invention used to provide a gear 2 with a pocket structure 28 configured to receive a segment comprising a toothed rim. FIG. 4B illustrates another perspective view of a processing unit shown in FIG. 4A. The processing machine 50 comprises a first gear attachment 46 configured to be detachably attached to the outer rim 8 of the gear 2. The processing machine 50 comprises a second gear attachment 46' configured to be detachably attached to the outer rim 8 of the gear 2.

Accordingly, it is possible to fix the processing machine 50 by means of the gear attachments 46, 46' adapted to be detachably attached to the outer rim 8 of the gear 2. A first arm 16 extends between the first gear attachment 46 and a support member 54 that is arranged parallel to the axial surface 44 of the gear 2. A second arm 16' extends between the second gear attachment 46' and the support member 54. The longitudinal axis of the support member 54 extends parallel to the tangential axis Y' of the processing machine 50.

The support member 54 comprises two parallel guides 48, 48' and a slide 52 being slidably attached to the guides 48, 48'. Hereby, it is possible to move the slide 52 along the tangential axis X' of the processing machine 50.

The slide 52 comprises a carrier 56 comprising a spindle unit configured to carry out a milling process hereby removing damaged teeth 4, 4' and providing a pocket structure 28 configured to receive a segment comprising a toothed outer rim 8. The processing machine 50 may comprise a Computer Numerical Control (CNC) controller. Hereby, it is possible to carry out a fast and high tolerance quality milling process.

The processing machine 50 may comprise one or more sensors configured to provide geometrical information about the structure being processed by the processing machine 50. It may be an advantage that the processing machine 50 comprises sensors configured to provide geometrical information about the pocket structure 28 being formed by the spindle unit of the processing machine 50.

The processing machine 50 is preferably configured to provide holes 32 (preferably threaded holes 32) in the bottom surface of the pocket structure 28.

The spindle unit 58 of the processing machine 50 is preferably moveably arranged in the processing machine 50 in such a manner that the spindle unit 58 can be moved radially along the radial axis Z', the axial axis Y' and the tangential axis X' of the processing machine 50.

Figure 5A:
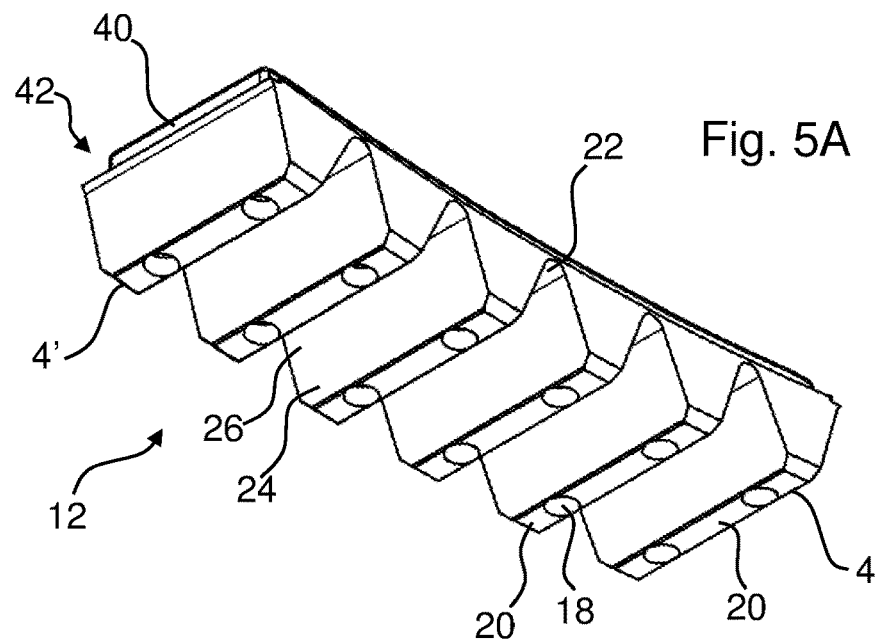
FIG. 5A shows a perspective view of a segment to be attached into a pocket structure provided in a gear by using the method according to the invention.
Figure 5B:
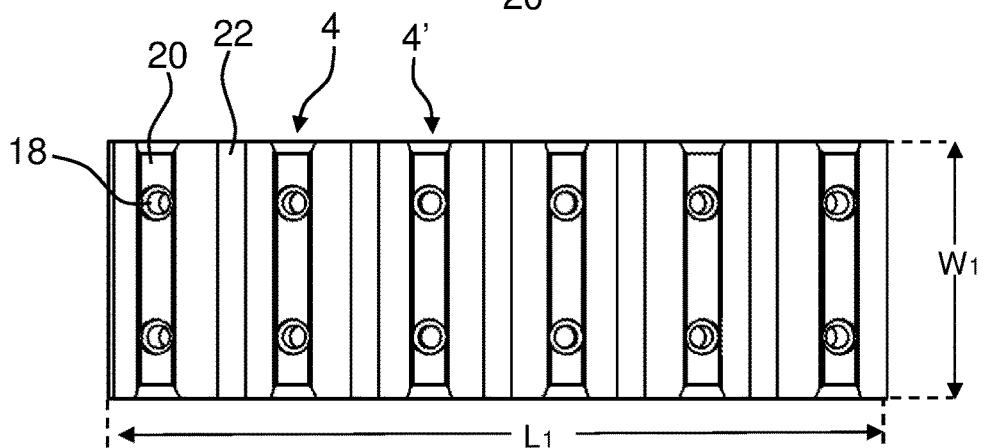
FIG. 5B shows an end view of the segment shown in FIG. 5A.
Figure 5C:
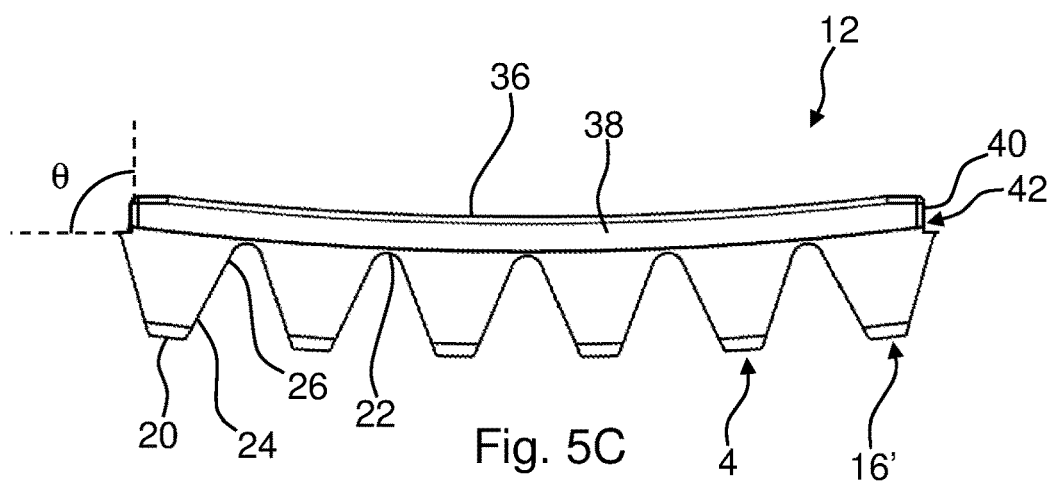
FIG. 5C shows a side view of the segment shown in FIG. 5A and FIG. 5B.

FIG. 5A illustrates a perspective view of a segment 12 to be attached into a pocket structure provided in a gear using the method according to the invention. FIG. 5B illustrates an end view of the segment 12 shown in FIG. 5A and FIG. 5C illustrates a side view of the segment 12 shown in FIG. 5A and FIG. 5B.

The segment 12 comprises a plurality of teeth 4, 4' evenly distributed along the outer rim of the segment 12. Each tooth 4, 4' comprises a top land 20 extending between faces 24 of the teeth 4, 4'. The proximate portion of each tooth 4, 4' comprises a flank 26 extending between the between faces 24 and the adjacent bottom land 22.

Two through holes 18 are provided in each tooth 4, 4'. The holes 18 are configured to receive a bolt (see FIG. 8A, FIG. 8D and FIG. 8E) for attaching the segment 12 to the underlying structure of the gear being repaired using the method according to the invention.

The segment 12 has a length $L_1$ and a width $W_1$ that allows the segment 12 to be inserted into a pocket structure 28 provided in the gear to be repaired. It may, however, be beneficial to cool down the segment 12 in order to facilitate (due to the shrinkage of the segment 12 when cooled down) the insertion of the segment 12 in the pocket structure 28.

The segment comprises a lower surface 36 and a support structure 38 extending between the lower surface 36 and the bottom portion of the teeth 4, 4'. Each end portion of the segment 12 is formed as a recess having an end wall 40 angled relative to the lower surface 36 of segment 12. The angle θ between the end wall 40 and the adjacent portion of the lower surface 36 is approximately 90 degrees. It is, however, possible to angle the end wall 40 differently relative to the adjacent portion of the lower surface 36. The angle θ between the end wall 40 and the adjacent portion of the lower surface 36 may be in the range 70-110°, preferably between 80-100°. If the angle θ between the end wall 40 and the adjacent portion of the lower surface 36 is less than 90°, is it required to reduce the size of the segment 12 relative to the size of the pocket structure 28 in order to insert the segment 12 into the pocket structure 28. This may be done by cooling down the segment 12.

Figure 6A:
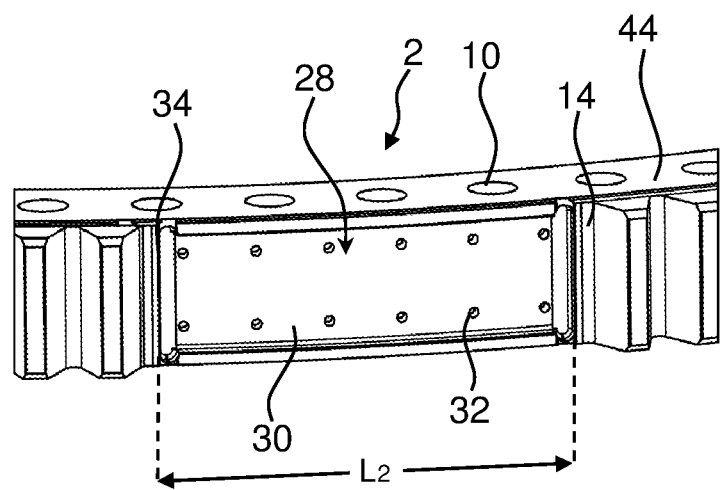
FIG. 6A shows a perspective view of a gear provided with a pocket structure before a segment has been attached to the pocket structure.
Figure 6B:
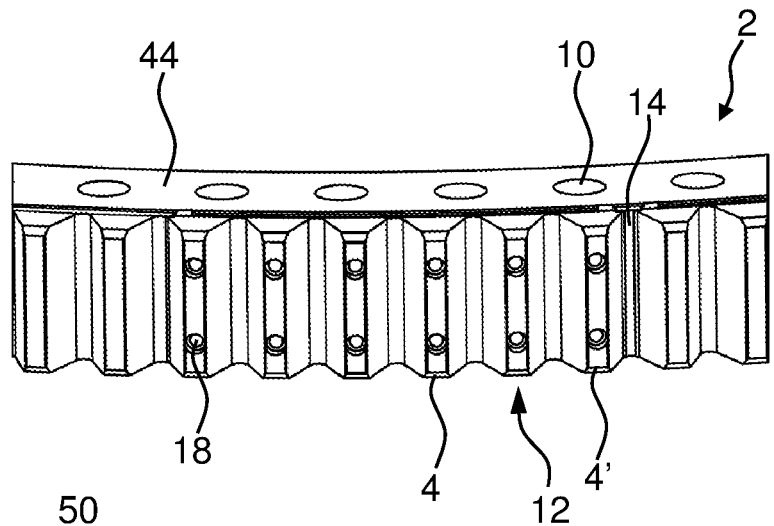
FIG. 6B shows a perspective view of the gear shown in FIG. 6A, in a configuration, in which a segment has been attached to the pocket structure.

FIG. 6A illustrates a perspective view of a portion of a gear 2 provided with a pocket structure 28 before a segment 12 (see FIG. 6B) has been attached to the pocket structure 28. FIG. 6B illustrates a perspective view of the portion of the gear 2 shown in FIG. 6A, in a configuration, in which a segment 12 has been attached to the pocket structure 28.

The gear 2 has an axial surface 44 provided with axially extending holes 10. The pocket structure 28 has a bottom surface 30 being a part of a convex cylindrical surface. A plurality of threaded holes 32 extend from the bottom surface 30 into the deeper layers of the gear 2. The holes 32 are configured to receive bolts for mechanically attaching the segment 12 to the pocket structure 28.

Each end structure 34 is formed as a rectangle with rounded corners. The length $L_2$ of the pocket structure 28 is indicated in FIG. 6A. A remaining structure 14, is provided next to each end structure 34 of the pocket structure 28.

In FIG. 6B, it can be seen that the segment 12 has been inserted into the pocket structure 28 shown in FIG. 6A. Bolts (not shown) can be inserted through the holes 18 provided in each tooth 4, 4' of the segment 12 in order to prevent the segment 12 from moving in the radial direction.

Figure 6C:
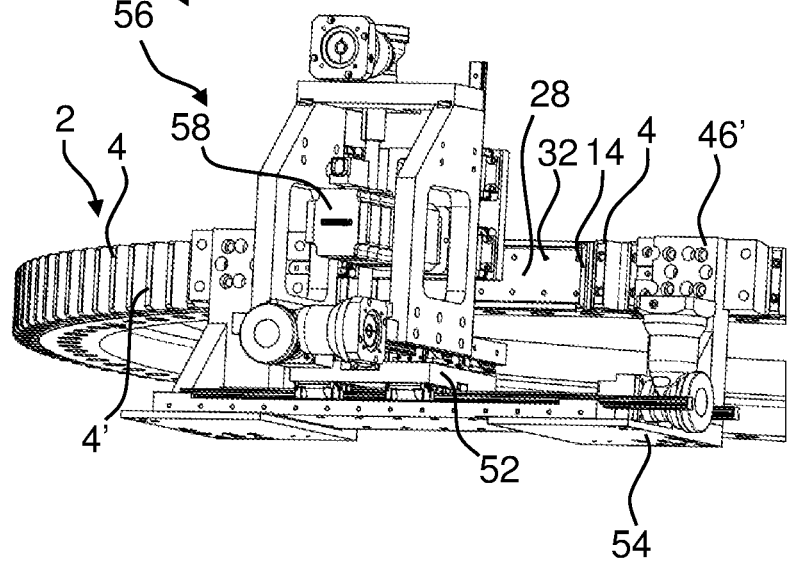
FIG. 6C shows a perspective view of a processing machine according to the invention.

FIG. 6C illustrates a perspective view of a processing machine 50 according to the invention. The processing machine 50 basically corresponds to the one shown in FIG. 4A and FIG. 4B and is attached to a gear 2 in order to repair the gear 2. The processing machine 50 has been used to provide a pocket structure 28 configured to receive a segment 12 corresponding to the one shown in FIG. 6B.

The processing machine 50 comprises two gear attachments 46' configured to be detachably attached to the outer rim of the gear 2. An arm extends between each gear attachment 46' and a support member 54 arranged parallel to the axial surface of the gear 2. The longitudinal axis of the support member 54 extends parallel to the tangential axis of the processing machine 50.

The processing machine 50 comprises a slide 52 comprising a carrier 56 having a spindle unit 58 configured to carry out a milling process hereby removing damaged teeth 4, 4' and providing a pocket structure 28 configured to receive a segment comprising a toothed outer rim.

The processing machine 50 is configured to provide threaded holes 32 in the bottom surface of the pocket structure 28.

FIG. 7A illustrates a top view of a gear 2 comprising a damaged portion 62 comprising a number of damaged teeth 4, 4' that need to be replaced.

FIG. 7B illustrates a top view of the gear 2 shown in FIG. 7A in a configuration, in which the damaged portion has been removed by using the method according to the invention. A segment 12 has been provided to replace the damaged portion. The segment 12 is provided with teeth 4, 4' and is configured to be radially inserted into the pocket structure 28 provided in the gear 2 as indicated with the arrow.

FIG. 7C illustrates a top view of the gear 2 shown in FIG. 7B in a configuration in which the segment 12 has been inserted into the pocket structure. The segment 12 is hereafter being fixed to the gear 2 by means of bolts 60 being radially screwed into gear 2.

By using the method according to the invention, it is possible to replace all teeth 4, 4' in the gear 2. Moreover, it is possible to process the gear radially from outside.

FIG. 7D illustrates a top view of an internal (annular) gear 2, in which the teeth 4, 4' are provided on the inside surface of a hollow cylindrical form. This gear 2 may be used in planetary gear systems. The teeth 4, 4' may be cut using a gear shaper machine. The gear 2 comprises a damaged portion 62 having a number of damaged teeth 4" that need to be replaced.

FIG. 7E illustrates a top view of the gear 2 shown in FIG. 7A in a configuration in which the damaged portion 62 has been removed by using the method according to the invention. A pocket structure 28 is provided in the gear 2 at the position, from which the damaged portion 62 has been removed.

FIG. 7F illustrates a top view of the gear 2 shown in FIG. 7E in a configuration, in which a segment 12' has been inserted into the pocket structure. The segment 12' comprises new teeth 4, 4'. Bolts 60 are preferably inserted into through holes in the segment 12 in order to screw the bolts 60 into radially extending threaded holes provided in the underlying structure of the gear 2. Hereby, it is possible to firmly fix the replaced segment 12 to the gear 2.

FIG. 8A illustrates a cross-sectional view of a gear 2 being repaired by using the method according to the invention. A damaged portion of the gear 2 has been removed and thus a pocket structure 28 has been made. Several radially extending threaded holes 32 have been provided in the underlying structure 64 of the gear 2.

The pocket structure 28 comprises a bottom surface 30 constituting a section of a cylindrical surface. The pocket structure 28 moreover comprises end surfaces provided on opposite ends of the bottom surface 30. It can be seen, that the remaining structures 14, 14' are arranged next to each end of the bottom surface 30. A contact wall 68 extends from the bottom surface 30 at each end of the bottom surface 30.

A segment 12 is provided above the pocket structure 28. The segment 12 is being radially inserted into the pocket structure 28 by moving the segment 12 in the direction indicated by the arrow.

The segment 12 comprises a lower surface 36 and is provided with six teeth 4, 4' being evenly distributed along the outer rim of the segment 12. One or more through holes 18 are provided in the teeth 4, 4'. Accordingly, it is possible to fix the segment 12 into the pocket structure 28 of the gear 2 by screwing bolts 60 extending through the holes 18 in the teeth 4, 4' into the threaded holes 32 provided in the underlying structure 64 of the gear 2.

FIG. 8B illustrates a view of the end tooth 4' of the segment 12 shown in FIG. 8A. The end tooth 4' is provided with a through hole 18 and has an end wall 40 configured to bear against the contact wall 68 of the pocket structure 28. The end tooth 4' has a support surface 66 configured to bear against the remaining structure 14' next to the pocket structure 28. The contact between the end wall 40 and the contact wall 68 of the pocket structure 28 will prevent the segment 12 from moving tangentially when it is inserted into the pocket structure 28. The bolts 60 will increase the break loose force required to break loose the segment 12.

FIG. 8C illustrates a top view of the portion of the gear 2 shown in FIG. 8A. The gear 2 is provided with a pocket structure 28 comprising a bottom surface 30 extending between two opposing end structures 34, 34' formed as a rectangle with rounded corners. Two threaded holes 32 are provided for each tooth in the bottom surface 30.

FIG. 8D illustrates a cross-sectional view of a gear 2, in which a damaged portion has been removed to form a pocket structure 28 configured to receive a segment 12 provided with new teeth. The method according to the invention is applied to remove the damaged portion of the gear 2 and provide the geometry of the pocket structure 28. FIG. 8E illustrates a cross-sectional view of a gear 2 shown in FIG. 8D in a configuration, in which the segment 12 has been attached to the gear 2.

The pocket structure 28 comprises a tangentially extending bottom surface 30 and an underlying structure 64 provided with two radially extending holes 32, 32' for receiving corresponding bolts 60, 60'. The pocket structure 28 comprises two opposing radially extending contact surfaces 74 extending perpendicular to the extending bottom surface 30. The pocket structure 28 moreover comprises a tangentially extending end structure 34 that extends parallel to the bottom surface 30 and is provided in the same level as the bottom surface 30.

It may be an advantage that no sharp corners are provided and that all corners are provided as arced structures in order to prevent the notch effect (stress peaks), which may reduce the mechanical strength of the repaired gear 2.

The segment 12 comprises holes extending from a countersink arranged at the top portion of the segment 12. The segment 12 comprises a lower surface 36 extending between two parallel radially extending contact surfaces 72. A tangentially extending surface 70 extends between the outer contact surface 78 and the radially extending contact surface 72.

In FIG. 8E, the tangentially extending surface 70 of the segment 12 bears against the radial surface 76 of the gear 2 and the radially extending contact surfaces 72 of the segment bear against the radially extending contact surfaces 74 of the pocket structure 28 of the gear 2. The lower surface 36 of the segment 12 bears against the bottom surface of the pocket structure 28 of the gear 2. The bolts 60, 60' are screwed into the threaded holes 32, 32' in the underlying structure 64 of the gear 2. It can be seen that the bolt head has been fully received by the countersink 80.

FIG. 9A illustrates a cross-sectional view of a gear 2, in which a damaged portion has been removed to form a pocket structure 28 configured to receive a segment 12 provided with new teeth. The segment 12 is provided with holes configured to receive bolts 60, 60'. The pocket structure 28 of the gear 2 is provided with corresponding threaded holes configured to receive the bolts 60, 60'. A massive underlying structure 64 is provided under the holes 32, 32'. The segment 12 basically corresponds to the one shown in FIG. 8D. However, the lowermost portion of the segment 12 comprises protruding portions 84, 84' extending along the side portions of the segment 12. Each of the protruding portions 84, 84' comprises an engagement surface 86, 86' configured to be brought into contact with a corresponding engagement surface 88, 88' of a receiving portion 82, 82' of the pocket structure 28 of the gear 2. The engagement surfaces 86, 86' of the segment 12 are configured to be supported on the engagement surfaces 88, 88' of the gear 2 (as illustrated in FIG. 9B).

In one embodiment, the lower surface 36 of the segment 12 is configured to be brought into contact with the bottom surface 30 of the pocket structure 28 of the gear 2. An adhesive (e.g. glue) may be provided between the lower surface 36 of the segment 12 and the bottom surface 30 of the pocket structure of the gear 2. Accordingly, the adhesive (e.g. glue) can fill out any air gaps and thus increase the friction between the lower surface 36 of the segment 12 and the bottom surface 30 of the pocket structure 28 of the gear 2.

In another embodiment, a small gap is provided between the lower surface 36 of the segment 12 and the bottom surface 30 of the pocket structure of the gear 2. Accordingly, it is achieved that the engagement surfaces 86, 86' of the segment 12 are brought into contact with the corresponding engagement surfaces 88, 88' of the pocket structure 28. It is, however, possible to add a layer of glue in the gap to increase the friction between the lower surface 36 of the segment 12 and the bottom surface 30 of the pocket structure 28 of the gear 2.

FIG. 9B illustrates a cross-sectional view of the gear shown in FIG. 9A in a configuration, in which the segment 12 has been attached to the gear 2. It can be seen that the engagement surfaces 86, 86' of the segment 12 have been brought into contact with the corresponding engagement surfaces 88, 88' of the pocket structure 28. Moreover, the bolts 60, 60' have been screwed into the treaded holes in the underlying structure 64.

FIG. 9C illustrates a perspective view of a gear 2, in a configuration, in which a segment 12 has been attached to a pocket structure of the gear 2. The segment 12 is configured to be mechanically attached to the gear 2 by means of bolts that can be screwed into threaded holes in the gear 2. Accordingly, the segment 12 is provided with a plurality of holes 18 arranged to provide access to the threaded holes of the gear 2. The holes 18 are provided in the bottom land 22.

FIG. 9D illustrates a cross-sectional view of a segment 12 being attached to a gear 2. The segment 12 comprises protruding portions 84, 84' extending along the side portions of the segment 12. These protruding portions 84, 84' are arranged and configured to engage with corresponding engagement surfaces 88, 88' of receiving portions 82, 82' of the pocket structure of the gear 2 so that the engagement surfaces 86, 86' of the segment 12 are brought into contact with the corresponding engagement surface 88, 88' of the pocket structure of the gear 2.

FIG. 9E illustrates a cross-sectional view of the segment 12 shown in FIG. 9D in a configuration, in which the segment 12 has been attached to the gear 2. It can be seen that the engagement surfaces 86, 86' of the segment 12 have been brought into contact with the corresponding engagement surfaces 88, 88' of the pocket structure of the gear 2. A gap 90 is provided between the segment 12 and the gear 2. An adhesive (e.g. a glue) can be filled into this gap 90 in order to increase the friction between the adjacent surfaces of the segment 12 and the pocket structure of the gear 2. It is also possible to provide a surface treatment (e.g. mechanically or laser induced structures) to at least one of said surfaces with the purpose of increasing the friction and achieving a better fixation of the segment 2 to the gear 2.

FIG. 9F illustrates a cross-sectional view of a segment 12 attached to a gear 2. The segment 12 basically corresponds to the one shown in FIG. 9E. A plurality of holes 92 have been provided in the segment 12. By means of laser light 94, it is possible to laser weld the structure near the bottom portion of the holes 92 in order to weld the gear 2 and the segment 12 together. Laser welding may preferably be achieved using a spot welding technique so that heating of the welded structures can be kept at a minimum level. Hereby, it is possible to maintain the mechanical properties of the structures that are welded together (and not generate hard and brittle material).

The segment 12 is furthermore provided with inclined holes for receiving bolts 60, 60' to be screwed into threaded holes in the gear 2. The inclined holes and bolts 60, 60' are angled basically 45 degrees relative to the radial direction X of the gear 2. The bolts 60, 60' are inserted through the holes provided in the outer contact surface 78 of the segment 12. The gear 2 corresponds to the one shown in FIG. 9D.

FIG. 9G illustrates a cross-sectional view of another segment 12 attached to a gear 2. The segment 12 corresponds to the one shown in FIG. 9F. There are, however, no holes 92 for laser welding the segment 12 and the gear 2 together. A gap 90 is provided between the segment 12 and the gear 2. Glue may be provided in the gap 90 to increase the friction between the segment 12 and the gear 2. The gear 2 corresponds to the one shown in FIG. 9D. The inclined holes and bolts 60, 60' are angled basically 45 degrees relative to the radial direction X of the gear 2.

One of the surfaces of the segment 12 and/or the gear 2 may be surface treated in order to increase the friction between the contact surfaces. In one embodiment, surface treatment is achieved by means providing a metallization of at least one of the surfaces.

Statement Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a bolt" includes a plurality of such bolts and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY"

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

LIST OF REFERENCE NUMERALS

2 Gear
4, 4', 4" Tooth
6 Inner structure
8 Outer rim
10 Hole
12, 12', 12", 12'" Segment
14, 14', 14" Remaining structure
16, 16' Arm
18 Hole
20 Top land
22 Bottom land
24 Face 26 Flank
28, 28', 28", 28'" Pocket structure
30 Bottom surface
32, 32' Hole (e.g. threaded hole)
34, 34' End structure
36 Lower surface
38 Support structure
40 End wall
42 Recess
44 Axial surface
46, 46' Gear attachment
48, 48' Guide
50 Processing machine
52 Side
54 Support member
56 Carrier
58 Spindle unit
60, 60' Bolt
62 Damaged portion
64 Underlying structure
66 Support surface
68 Contact wall
70 Tangentially extending contact surface
72 Radially extending contact surface
74 Radially extending contact surface
76 Radial surface
78 Outer contact surface
80 Countersink
82, 82' Receiving portion
84, 84' Protruding portion
86, 86', 88, 88' Engagement surface
90 Gap
92 Hole
94 Laser light
α Angle
X, Y, Z Axis
X', Y', Z' Axis
I, II, III, IV Portion

What is claimed is:

1. A method for repairing a gear having at least one damaged tooth, the method comprising the steps of:
   removing material including at least one damaged tooth from the gear to provide a pocket structure;
   providing a segment to be inserted into the pocket structure, the segment comprising an undamaged tooth disposed upon a support structure;
   wherein a bottom surface of the undamaged tooth extends beyond an outer perimeter of the support structure along a lateral dimension and a longitudinal dimension of the segment, thereby exposing the bottom surface of the undamaged tooth in two dimensions;
   milling the pocket structure such that a geometry of the pocket structure fits a geometry of the segment; and
   radially inserting the segment into the pocket structure such that the bottom surface of the undamaged tooth at least partially overlaps a remaining portion of the gear in a radial direction;
   wherein the support structure has a concave bottom surface.

2. The method of claim 1, wherein the pocket structure has a convex bottom surface.

3. The method of claim 1, further comprising drilling one or more radially extending holes in an underlying structure of the gear.

4. The method of claim 3, further comprising attaching radially extending attachment structures through the segment and into the underlying structure of the gear.

5. The method of claim 1, further comprising attaching radially extending attachment structures through the segment and into an underlying structure of the gear.

6. The method of claim 1, wherein the segment comprises one or more holes extending vertically from a peak of the undamaged tooth to the bottom surface of the support structure.

7. The method of claim 6, further comprising inserting radially extending attachment structures through the one or more holes and into an underlying structure of the gear.

8. The method of claim 1, further comprising drilling one or more holes extending between a peak of the undamaged tooth to the bottom surface of the support structure.

9. The method of claim 8, further comprising inserting radially extending attachment structures through the one or more holes and into an underlying structure of the gear.

10. The method of claim 1, further comprising fixing a plurality of the segments directly adjacent each other.

11. The method of claim 1, wherein a portion of the undamaged tooth extending beyond the outer perimeter of the support structure has a vertical thickness that is less than or equal to a thickness of the support structure.

12. The method of claim 1, wherein the pocket structure comprises a pair of raised side walls oriented parallel to one another and defining a channel therebetween.

13. The method of claim 12, wherein each end of the channel comprises an area extending longitudinally and laterally beyond the raised side walls to form a pair of symmetrical shapes.

14. The method of claim 13, wherein the bottom surface of the support structure has a shape matching the channel and the pair of symmetrical shapes of the pocket structure.

15. The method of claim 1, wherein the gear is a cylinder having an interior surface defining a central cavity of the cylinder and an external surface comprising one or more teeth having peaks pointing radially away from the central cavity and the step of milling the pocket structure is performed on the external surface.

16. The method of claim 1, further comprising removing additional material from the gear to provide a second pocket structure that is separated from the pocket structure only by the remaining portion.

17. The method of claim 16, further comprising:
   providing a second segment to be inserted into the second pocket structure, the second segment comprising a second undamaged tooth disposed upon a second support structure;
   wherein a bottom surface of the second undamaged tooth extends beyond an outer perimeter of the second support structure along a lateral dimension and a longitudinal dimension of the second segment, thereby exposing the bottom surface of the second undamaged tooth in two dimensions;
   milling the second pocket structure such that a geometry of the second pocket structure fits a geometry of the second segment; and
   radially inserting the second segment into the second pocket structure such that the bottom surface of the second undamaged tooth at least partially overlaps the remaining portion of the gear in a radial direction.

18. The method of claim 17, wherein the second pocket structure comprises a second pair of raised side walls oriented parallel to one another and defining a second channel therebetween.

19. The method of claim 18, wherein each end of the second channel comprises an area extending longitudinally and laterally beyond the second pair of raised side walls to form a second pair of the symmetrical shapes.

20. The method of claim 1, wherein the step of radially inserting the segment into the pocket structure causes the bottom surface of the undamaged tooth to abut the remaining structure.

\* \* \* \* \*